United States Patent [19]
Noddings et al.

[11] 4,177,492
[45] Dec. 4, 1979

[54] ELECTRICAL PROTECTION CIRCUITS

[75] Inventors: John Noddings, Coventry; Michael D. Cox, Rugby, both of England

[73] Assignee: Associated Engineering Limited, England

[21] Appl. No.: 869,648

[22] Filed: Jan. 16, 1978

[30] Foreign Application Priority Data

Feb. 8, 1977 [GB] United Kingdom ............... 5069/77

[51] Int. Cl.² ........................ H02H 3/08; H02H 7/08
[52] U.S. Cl. ...................................... 361/31; 361/93
[58] Field of Search .................. 361/31, 24, 30, 93, 361/98, 100, 101

[56] References Cited

U.S. PATENT DOCUMENTS

| | | | |
|---|---|---|---|
| 3,925,709 | 12/1975 | Mitchell et al. | 361/100 |
| 4,061,961 | 12/1977 | Baker | 361/100 X |

FOREIGN PATENT DOCUMENTS

| | | | |
|---|---|---|---|
| 1590127 | 1/1970 | Fed. Rep. of Germany | 361/100 |
| 2219043 | 10/1973 | Fed. Rep. of Germany | 361/93 |

*Primary Examiner*—Harry E. Moose, Jr.
*Attorney, Agent, or Firm*—Leydig, Voit, Osann, Mayer & Holt, Ltd.

[57] ABSTRACT

A circuit arrangement is disclosed for protecting against overload electrical equipment such as an electric motor, and any mechanical equipment driven thereby, such as a power actuator. Two light emitting diodes are connected in parallel with each other (with opposite polarity) and in parallel with a series impedance in the power supply circuit of the motor so that each produces a light output in response to an overload current of appropriate polarity in the motor. Associated with each diode is a respective phototransistor which responds to the light output from the associated diode and, via a respective control circuit, operates a switch to interrupt the load current.

6 Claims, 1 Drawing Figure

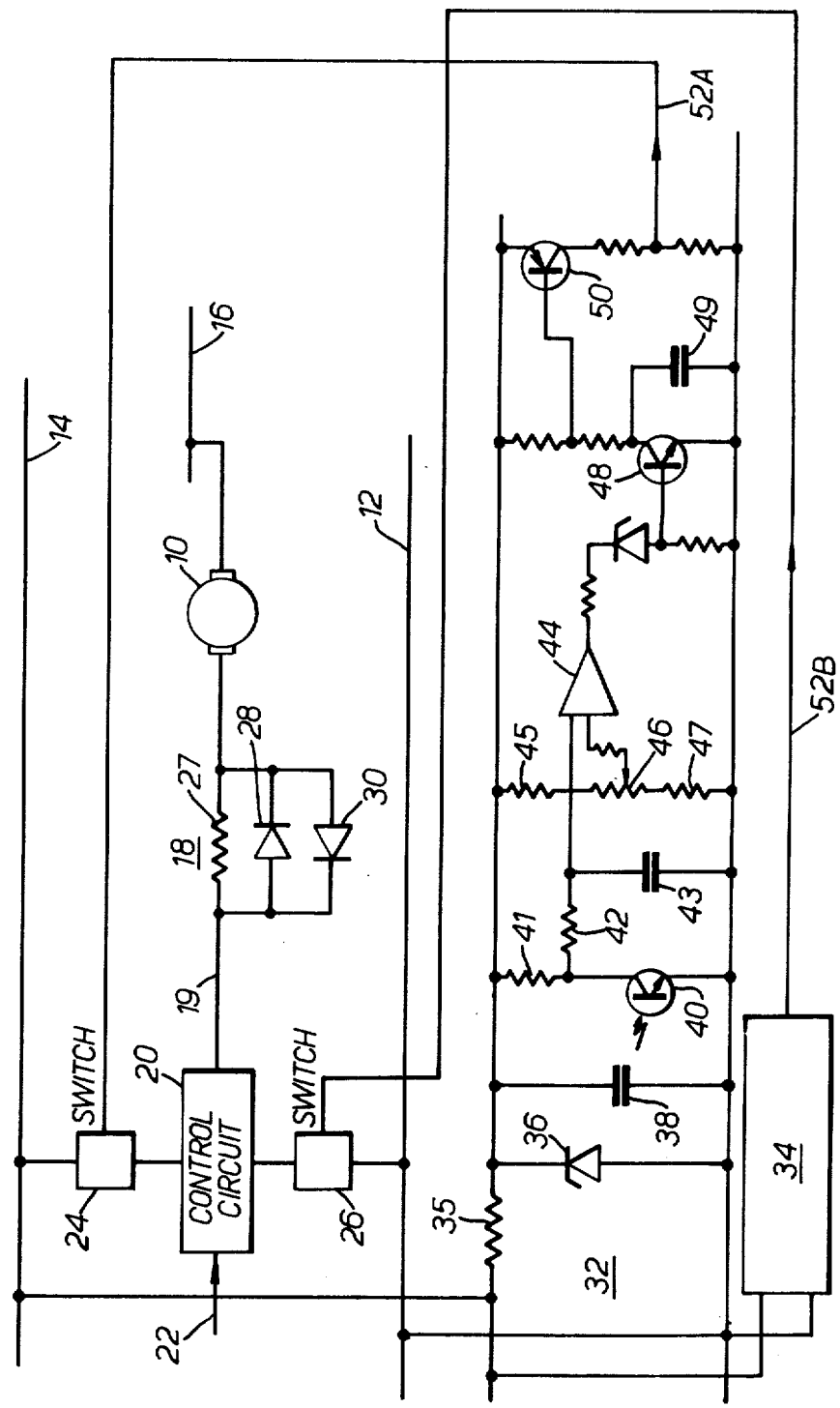

ELECTRICAL PROTECTION CIRCUITS

BACKGROUND OF THE INVENTION

The invention relates to electrical circuit arrangements, and more particularly to circuit arrangements for protecting electrical equipment against overload or for protecting against overload mechanical equipment, such as a linkage, driven by electrical equipment such as by an electrical motor or an electrically controlled pneumatic actuator. The protection may involve cutting off or reducing the electric current, at least momentarily, to the electrical equipment.

BRIEF SUMMARY OF THE INVENTION

According to the invention, there is provided an overload protection circuit arrangement for protecting against overload electrical equipment and any mechanical equipment driven thereby, comprising electrically responsive energy output means arranged for connection in circuit with the said electrical equipment so as to be responsive to an overload current therein and to produce an energy output corresponding thereto, transducing means arranged to be responsive to the said energy output and to produce a corresponding electrical signal, and control means responsive to the said control signal for interrupting the overload current.

According to the invention, there is also provided an electrical circuit arrangement for protecting an electric motor against overload, comprising a sensing circuit for connection in series with the motor supply and comprising a series impedance and an electrically responsive light output transducer connected across the impedance to produce a light output in response to the voltage developed across the impedance when an overload current for the motor flows therethrough, a light-responsive electrical transducer arranged to receive the light output from the light output transducer and to produce a corresponding electrical control signal, and control means responsive to the control signal to interrupt the current to the motor.

DESCRIPTION OF DRAWINGS

An overload protection circuit arrangement embodying the invention will now be described, by way of example only, with reference to the accompanying diagrammatic drawing which is a schematic circuit diagram of the arrangement.

DESCRIPTION OF PREFERRED EMBODIMENTS

As shown in the FIGURE, the electric motor 10, which is to be protected against overload, in connected in a power supply circuit comprising a zero volt line 12, a first positive voltage line 14 and a second positive voltage line 16, the voltage of the latter line being less than the voltage of the line 14 (for example, it may be half of the voltage on line 14). One motor terminal is connected to the line 16, while the other motor terminal is connected via a circuit 18 and a line 19 to a control unit 20 which is in the form of a switching circuit controlled by a control signal on a line 22. According to the value of this control signal, the switching circuit 20 connects the line 19 either to the line 12 or to the line 14, according to the desired direction of rotation of the motor, and the motor is energised, and rotates, accordingly. The switching circuit 20 connects the line 19 to the lines 12 and 14 via respective switching elements 24 and 26 which are normally ON.

The motor 10 may, for example, be a motor driving an actuator and the overload against which it is to be protected may be an overload caused by jamming of the actuator.

The circuit 18 comprises a series resistor 27 having a relatively low value, 0.5 ohms say, and two light-emitting diodes (LEDs) 28 and 30 are connected in parallel with the resistor 27 but in back-to-back configuration. The effect is, therefore, that LED 28 is energised by the voltage developed across resistor 27 (and LED 30 is not energised) when the motor 10 is running in one direction, while LED 30 is energised by the voltage developed across the resistor 27 (and LED 28 is not energised) when the motor is running in the opposite direction.

The circuit 18 constitutes part of the protective circuit arrangement for the motor 10, and the rest of the protective circuit arrangement comprises two identical circuits 32 and 34, of which only the circuit 32 is shown in detail.

Circuit 32 may be supplied from the lines 12 and 14, and a resistor 35, a zener diode 36 and a capacitor 38 feed a relatively smooth and stable supply voltage across a phototransistor 40 via a load resistor 41. The output from the phototransistor fed via a resistor 42 and across a capacitor 43 to a comparator 44 where it is compared with a reference voltage from a potential divider comprising resistors 45, 46 and 47. The latter controls a transistor 48 having a time delay capacitor 49 connected across it and which in turn controls an output switching transistor 50. The state of the latter controls the level on an output line 52A.

The circuit 34 is similar to the circuit 32 and has an output line 52B.

Line 52A is connected to control the switching element 24, and line 52B is connected to control the switching element 26.

By means of a suitable optical arrangement, such as including fibreoptics for example, the light output of the LED 28 is arranged to control the conduction of phototransistor 40 in the circuit 32, while the light output of LED 30 is arranged to control the conduction of the photo-transistor 40 in the circuit 34.

In operation, the motor drives in a predetermined direction according to the value of the signal on the line 22. According to the direction of the motor's rotation, one or other of the LED's 28 and 30 is energised to emit light. However, in the absence of motor overload, the light intensity emitted is not sufficient to make a significant difference to the conduction of the photo-transistor 40 in the appropriate circuit 30 or 32. The photo-transistor therefore remains substantially non-conductive, and under these conditions the comparator 44 holds the transistors 48 and 50 non-conductive. Since the other LED is emitting substantially no light under these conditions, the other of the two circuits 32 and 34 also has its transistors 48 and 50 held non-conductive. Lines 52A and 52B are therefore substantially at zero volts, and switches 24 and 26 are both held ON.

If motor overload should occur, the light output of the conducting LED (LED 28 for example) increases and causes the photo-transistor 40 in the circuit 32 to begin to conduct. After a delay introduced by capacitor 43 (to render the circuit insensitive to transient overloads), the resultant voltage drop is detected by the comparator 44 which switches on transistor 48 and, in turn, transistor 50. Line 52A rises positively, therefore, and switches the switching element 24 OFF. The current supply to the motor is therefore interrupted.

Interruption of the motor current de-energises the LED 28, and photo-transistor 40 consequently re-assumes its high impedance state and comparator 44 renders transistor 48 non-conductive. However, capacitor 49 ensures that transistor 50 remains conductive for a further predetermined time delay, and the result is that the switching element 24 is not switched ON again until the end of this time delay. The lengths of the time delays introduced by capacitors 43 and 49 are selected to ensure that no component (such as a component being driven by the motor) is damaged by the overload.

If of course the motor is running in the opposite direction, then it will be the LED 30 which detects an overload condition and, via the photo-transistor 40 and the comparator 44 of the circuit 34, switches the switching element 26 OFF to interrupt the motor current.

It will be appreciated that the power supply circuit for the motor 10 can be modified as desired according to the application of the motor, and the circuit shown is merely by way of example. Furthermore, if the motor is arranged to run in one direction only, then of course it is only necessary to provide one coupling arrangement.

The protective circuit arrangement shown is not limited to use for protecting electrical motors against overload, but may be used to protect other electrical equipment against overload.

Instead of LED's, other electrically energisable light output devices may be used. Similarly, the photo-transistors 40 can be replaced by other light responsive electrical devices. However, it is not necessary for these devices to be light output and light responsive; they could be devices functioning by means of some other form of energy—for example, the light output devices could be replaced by devices producing magnetic fields and the light responsive devices could be replaced by devices responsive to such magnetic fields.

What is claimed is:

1. An overload protection circuit arrangement for protecting against overload an electric motor having a power supply circuit and a mechanical actuator driven by the motor, comprising
   bi-polar electrically responsive energy-output means connected in circuit with said power supply circuit so as to be responsive to a motor overload current of either polarity therein and to produce a non-electrical energy output corresponding to either such overload current,
   transducing means operatively associated with said electrically responsive energy output means so as to be responsive to each said non-electrical energy output thereof and to produce a corresponding electrical control signal,
   control means connected to be responsive to each said control signal and associated with said power supply circuit for interrupting the corresponding overload current in the motor, and
   timing means operative in response to either said control signal for holding the motor current interrupted for at least a predetermined time delay and then allowing its reconnection.

2. A circuit arrangement according to claim 1, in which the bi-polar electrically responsive energy-output means comprises two light-emitting diodes respectively connected to respond to the overload currents of opposite polarity, and the transducing means comprises a respective light-responsive electrical transducing device corresponding to each light-emitting diode.

3. An overload protection circuit arrangement for protecting against overload electrical equipment having a power supply circuit, comprising
   two electrically responsive light-output devices each connected in said power supply circuit but with opposite polarity, whereby one responds to overload current of one polarity and produces a light output corresponding thereto and the other responds to overload current of the opposite polarity and produces a light output corresponding thereto,
   two light-responsive electrical transducing devices one for each electrically responsive light-output device and each arranged to produce a respective electrical control signal in response to the said light output thereof, and
   control means connected to be responsive to each said control signal and associated with said power supply circuit for interrupting the corresponding overload current therein.

4. A circuit arrangement according to claim 3, in which each electrically responsive light-output device comprises a respective light emitting diode.

5. A circuit arrangement according to claim 3, in which each light-responsive electrical transducing device comprises a respective phototransistor.

6. An electrical circuit arrangement for protecting an electric motor having a power supply circuit against overload, comprising
   a sensing circuit connected in series with the power supply circuit, the sensing circuit comprising a series impedance, a first light-emitting diode connected across the impedance to produce a light output in response to the voltage developed across the impedance when an overload current of one polarity for the motor flows therethrough, and a second light-emitting diode connected in parallel with the first diode but with reversed polarity so as to produce a light output in response to the voltage developed across the impedance when an overload current of the opposite polarity for the motor flows therethrough,
   a first light-responsive electrical transducer physically mounted to receive the light output from the first diode and to produce an electrical control signal in response to that light output, and a second light-responsive electrical transducer physically mounted to receive the light output from the second diode whereby to produce a said electrical control signal in response to that light output, and
   control means responsive to each said control signal and including means connected in the power supply circuit to interrupt the current in the power supply circuit.

* * * * *